US007526177B2

(12) United States Patent
Matthijsse et al.

(10) Patent No.: US 7,526,177 B2
(45) Date of Patent: Apr. 28, 2009

(54) FLUORINE-DOPED OPTICAL FIBER

(75) Inventors: Pieter Matthijsse, Hapert (NL); Frans Gooijer, Eindhoven (NL); Ivo Flammer, Paris (FR); Elise Regnier, Bievres (FR); Gerard Kuyt, Boxtel (NL)

(73) Assignee: Draka Comteq B.V., Amsterdam (NL)

(*) Notice: Subject to any disclaimer, the term of this patent is extended or adjusted under 35 U.S.C. 154(b) by 0 days.

(21) Appl. No.: 11/772,946

(22) Filed: Jul. 3, 2007

(65) Prior Publication Data

US 2008/0138021 A1 Jun. 12, 2008

(30) Foreign Application Priority Data

Jul. 4, 2006 (FR) .................................. 06 06058

(51) Int. Cl.
*G02B 6/036* (2006.01)
*G02B 6/00* (2006.01)

(52) U.S. Cl. ...................... 385/142; 385/126; 385/141; 385/144

(58) Field of Classification Search ......... 385/123–128, 385/141–145
See application file for complete search history.

(56) References Cited

U.S. PATENT DOCUMENTS

RE30,635 E 6/1981 Kuppers et al.
4,314,833 A 2/1982 Kuppers
4,690,504 A 9/1987 Yokokawa et al.
4,988,162 A 1/1991 Hayami
5,306,322 A * 4/1994 Ishikawa et al. .............. 65/397
5,509,101 A 4/1996 Gilliland et al.
5,681,365 A 10/1997 Gilliland et al.
6,947,650 B1 9/2005 Homa
2005/0063663 A1* 3/2005 Anderson et al. ........... 385/142

FOREIGN PATENT DOCUMENTS

WO 2005/109055 A3 11/2005

OTHER PUBLICATIONS

Extended European Search Report in corresponding European Application No. 07011759, dated Nov. 6, 2007.
French Search Report and Written Opinion for counterpart French Application No. FR 0606058, mailed on Jan. 23, 2007.
Sanada K et al: "Radiation resistance of fluorine-doped silica-core fibers," 1994, pp. 339-344, vol. 179, Journal of Non-Crystalline Solids, North-Holland Physics Publishing, Amsterdam, NL.
Kakuta T et al: "Development of in-core monitoring system using radiation resistant optical fibers," Oct. 10, 1994, pp. 371-374, vol. 1, Nuclear Science Symposium and Medical Imaging Conference, 1994 IEEE Conference Record Norfolk, VA, US.

* cited by examiner

*Primary Examiner*—Charlie Peng
(74) *Attorney, Agent, or Firm*—Summa, Additon & Ashe, P.A.

(57) ABSTRACT

A single mode optical transmission fiber comprises a depressed core having at least 0.41 weight percent fluorine and an index difference ($|\Delta n_1|$) with pure silica greater than $1.5\times10^{-3}$, a depressed cladding having at least 1.2 weight percent fluorine and an index difference ($|\Delta n_2|$) with pure silica greater than $4.5\times10^{-3}$ and an index difference ($|\Delta n_2|-|\Delta n_1|$) with the depressed core greater than or equal to $3\times10^{-3}$.

20 Claims, 2 Drawing Sheets

Δn
0
a
b
fiber radius
-Δn1
-Δn2

FLUORINE-DOPED OPTICAL FIBER

CROSS-REFERENCE TO PRIORITY APPLICATION

This application hereby claims the benefit of pending French Application No. 06/06058 (filed Jul. 4, 2006, at the French Patent Office), which is hereby incorporated by reference in its entirety.

FIELD OF THE INVENTION

The present invention relates to optical fiber transmissions and, more specifically, to a fluorine-doped optical fiber.

BACKGROUND OF THE INVENTION

The refractive index profile of optical fibers is generally qualified in relation to the plotting of a graph that shows the function associating the refractive index of the fiber with the radius of the fiber. Conventionally, the distance, r, to the center of the fiber is shown along the abscissa axis, and the difference between the refractive index of the fiber core and the refractive index of the fiber cladding is shown along the ordinate axis. The index profile is therefore described as "step," "trapezoid," or "triangular" for graphs, showing, respectively, step, trapezoid, or triangular shapes. These curves are generally representative of the theoretical profile (or set profile) of the fiber. The manufacturing of the fiber may lead to a slightly different profile.

An optical fiber conventionally consists of an optical core whose function is to transmit and optionally amplify an optical signal and an optical cladding whose function is to confine the optical signal within the core. For this purpose, the refractive indexes of the core, $n_c$, and the cladding, $n_g$, are such that $n_c>n_g$. As is well known, the propagation of an optical signal in a single-mode optical fiber breaks down into a fundamental mode guided in the core and secondary modes guided over a certain distance in the core-cladding assembly (i.e., cladding modes).

The signal transmitted in the fiber undergoes optical losses that accumulate over the distance traveled. These transmission losses increase when the fiber is subjected to ionizing radiation, such as beta, alpha, gamma and X radiation. In this regard, the fiber may be subjected to radiation when it is used for an optical communications system in an environment having ionizing radiation (e.g., in a nuclear plant, a particle acceleration laboratory, or a satellite sent into space). In such environments, radiation may reach dose levels of 100 gray (Gy) or more (i.e., 10,000 rad or more).

Conventionally, Standard Single Mode Fibers (SSMF) are used as line fibers in optical fiber transmission systems. The step index is generally obtained by doping with phosphorus or germanium, which can increase the refractive index. The step index may also be obtained by doping with fluorine, which can reduce the refractive index. These optical fibers (SSMF) have low transmission losses, generally less than 0.4 dB/km over a broad spectral range (at least 1300-1650 nanometers) but are sensitive to ionizing radiation. A SSMF fiber placed in an environment radiating 30 kGy will have its transmission losses increased by 10 to 10,000 dB/km at a wavelength of 1310 nanometers. This increase strongly depends on radiation conditions, particularly dose rate. A conventional SSMF fiber, therefore, is not suitable for use in an optical communications system installed in an environment having high doses of ionizing radiation (e.g., higher than 100 to 1,000 Gy).

Some known fibers are specifically designed for use in an environment where there is ionizing radiation. For example, U.S. Pat. No. 4,690,504 discloses a single-mode optical fiber with a germanium-free core. The absence of germanium in the core makes it possible to obtain better resistance to ionizing radiation. The optical cladding is doped with a dopant, such as fluorine, that reduces the refractive index. This patent also discloses an embodiment in which the core of a fiber is slightly fluorine-doped to offset excess oxygen in the core.

U.S. Pat. No. 5,509,101 discloses an optical fiber resisting X and gamma radiation. This fiber has a core and a cladding doped with fluorine. This patent describes several embodiments with different concentrations of fluorine and germanium. This patent indicates that transmission losses are reduced when the core of the fiber also includes germanium.

International Publication No. WO 2005/109055 discloses an optical fiber with a core of pure silica and a fluorine-doped cladding. This publication indicates that a high ratio (e.g., 9-10) between the diameter of the cladding and the diameter of the core improves the fiber's resistance to ionizing radiation.

The prior art fibers show some resistance to ionizing radiation but nevertheless have high losses under strong radiation, particularly over and above 400 Gy. As noted, standard single mode fibers (SSMFs) are typically used as line fibers in optical fiber transmission systems. Such fibers have a chromatic dispersion and a chromatic dispersion slope meeting specific telecommunications standards. To promote compatibility between the optical systems of different manufacturers, the International Telecommunication Union (ITU) has established a standard referenced ITU-T G.652, which must be met by a Standard Single Mode Fiber (SSMF). This standard is sub-divided into four sub-standards (A, B, C, and D) of greater or lesser severity.

For example, the G.652B standard for transmission fibers, recommends inter alia: a range of between 8.6 and 9.5 microns for the Mode Field Diameter (MFD) at a wavelength of 1310 nanometers; a maximum of 1260 nanometers for the cabled cut-off wavelength; a range of between 1300 and 1324 nanometers for the zero dispersion wavelength ($\lambda_0$); and a maximum of 0.093 ps/nm$^2$-km for the chromatic dispersion slope value.

The cabled cut-off wavelength is conventionally measured as the wavelength at which the optical signal is no longer single-mode after propagation over 22 meters of fiber, such as defined by sub-committee 86A of the International Electrotechnical Commission under standard IEC 60793-1-44.

Despite prior efforts, there remains a need for a transmission fiber that shows an improved resistance to high-dose radiation.

SUMMARY OF THE INVENTION

For this purpose, the present invention proposes an optical fiber whose refractive index profile is uniformly depressed with respect to the profile of a standard single mode fiber (SSMF). The transmission characteristics of the optical fiber substantially meet the standard G.652B and show an improved resistance to high-dose radiation (e.g., doses of more than 100 Gy).

Accordingly, the invention embraces a single mode optical transmission fiber comprising: (i) a depressed core containing at least 0.41 weight percent fluorine and having an absolute refractive index difference ($|\Delta n_1|$) with pure silica of more than $1.5\times10^{-3}$; and (ii) a depressed cladding containing at least 1.2 weight percent fluorine and having an absolute refractive index difference ($|\Delta n_2|$) with pure silica of more than $4.5\times10^{-3}$ and an absolute refractive index difference ($|\Delta n_2|-|\Delta n_1|$) with the depressed core of more than $3\times10^{-3}$.

Typically, the fiber has a link-polarization mode dispersion value of less than or equal to 0.20 ps/km$^{1/2}$.

Advantageously, at a wavelength of 1310 nanometers, the fiber shows a variation in attenuation of less than 100 percent for radiation ranging from 200 to 30,000 Gy at a rate of more than 1 Gy/s.

Provision can be made for the fiber to have a core that does not contain germanium. Likewise, provision can be made for the fiber to have a core that does not contain phosphorus.

It may be provided that the fiber has a ratio of fluorine concentration in the core and fluorine concentration in the cladding of more than 3.

Provision can also be made for the fiber to have transmission losses of less than 5 dB/km at a wavelength of 1310 nanometers with no ionizing radiation. Advantageously, the transmission losses are less than 0.35 dB/km at 1310 nanometers with no ionizing radiation.

Typically, the fluorine content in the depressed core is 1.4 weight percent or less. This fully satisfies the needs for a transmission fiber having reduced transmission losses under high radiation but retains compatibility with the G.652B standard for single-mode fiber.

At least a portion of the fiber of the present invention can be intended for use in an optical communications system located in an environment where there is ionizing radiation.

Advantageously, the optical system also comprises portions of standard single mode fiber (SSMF).

Other characteristics and advantages of the invention will become apparent on reading the following description of embodiments of the invention given by way of example with reference to the appended drawings.

DETAILED DESCRIPTION

The inventive fiber is a single mode transmission fiber that has a depressed core and a depressed inner cladding.

A depressed core includes a central radial portion of the fiber having a refractive index that is lower than the index of an outer cladding ($n_g$), generally consisting of pure silica or fluorine-doped silica. The depressed cladding is a radial portion of the fiber whose refractive index is lower than the outer cladding index and the core index.

The depressed core contains at least 0.41 weight percent fluorine and, typically, at most 1.4 weight percent fluorine. The depressed core has an absolute refractive index difference with pure silica of more than $1.5\times10^{-3}$ (or 0.1 percent). The depressed cladding contains at least 1.2 weight percent fluorine and has an absolute refractive index difference with pure silica of more than $4.5\times10^{-3}$ (or 0.3 percent). The ratio of fluorine concentrations in the core and in the cladding may advantageously be higher than 3 to ensure a sufficient difference between the index of the core and the index of the optical cladding. As noted, according to the present invention, the core need not be doped with either germanium or phosphorus.

Figure 1:
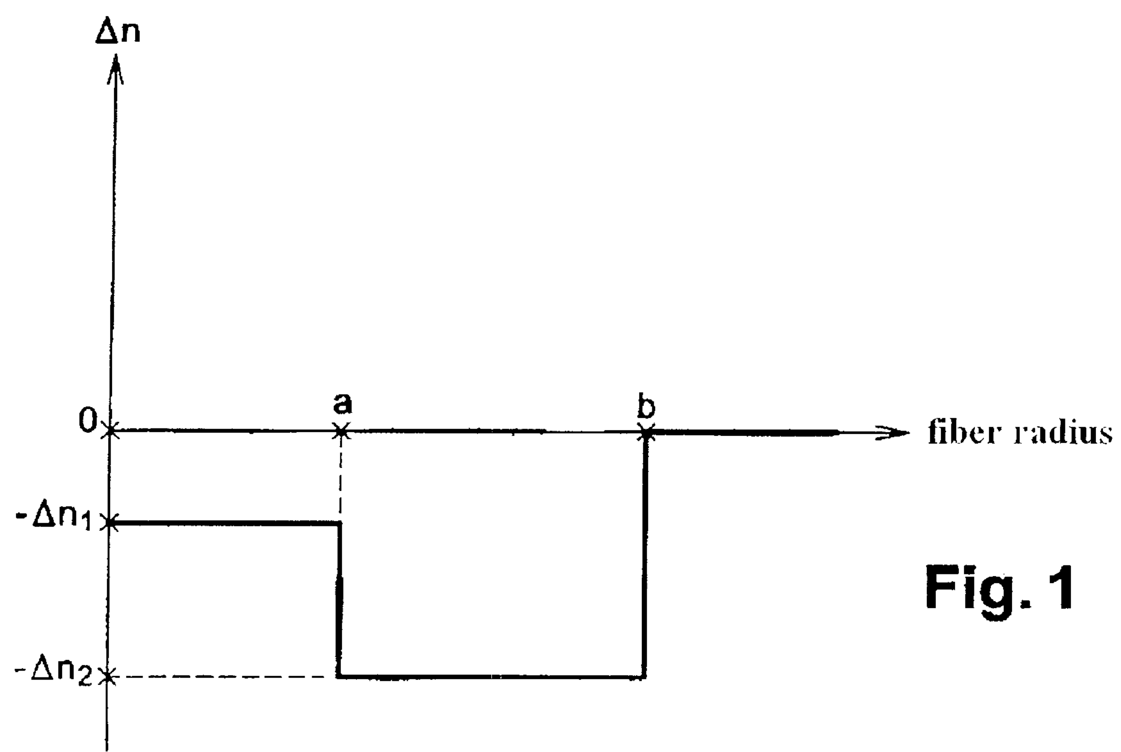
FIG. 1 depicts the set profile of a fiber according to a first embodiment of the invention.

FIG. 1 illustrates a refractive index profile for a first embodiment of a transmission fiber according to the present invention. The illustrated profile is a set profile (i.e., representing a theoretical profile of the fiber). The fiber actually obtained after drawing from a preform might have a slightly different profile.

The transmission fiber of the invention includes a central depressed core having an absolute refractive index difference $|\Delta n_1|$ with pure silica (which is sometimes used on the outside of the fiber to act as an outer optical cladding), and a depressed cladding having an absolute refractive index difference $|\Delta n_2|$ with pure silica. The refractive indexes in the depressed core and the depressed cladding are substantially constant longitudinally. This imparts longitudinally uniform properties to the fiber. The central core is represented with a radius, a, and the depressed cladding extends between the radial values a and b. See FIG. 1.

To define a set refractive index profile for an optical fiber, the refractive index of pure silica is generally taken as a reference. The refractive index values of the central core and depressed cladding are then presented as refractive index differences $\Delta n_1$ and $\Delta n_2$. The refractive index difference $\Delta n_1$ of the central core with silica is therefore the difference between the refractive index of silica and the refractive index of the central core ($\Delta n_1=n_{silica}-n_{core}$). The refractive index difference $\Delta n_2$ of the depressed cladding is therefore the difference between the refractive index of silica and the refractive index of the depressed cladding ($\Delta n_2=n_{silica}-n_{depressed\text{-}cladding}$). An outer cladding, which consists of silica, may be doped to increase or reduce its refractive index ($n_g$) (e.g., to modify signal propagation characteristics).

According to the first embodiment shown in FIG. 1, the core of the fiber contains 0.81 weight percent fluorine but no germanium and no phosphorus; it has a radius, a, of 4.35 microns and an absolute refractive index difference $|\Delta n_1|$ with the silica outer cladding of $3.0\times10^{-3}$. The cladding contains 2.16 weight percent fluorine and may not contain germanium or phosphorus; it has an absolute refractive index difference $|\Delta n_2|$ with the silica outer cladding of $8.0\times10^{-3}$ and a radius, b, such that b/a equals 8. Thus, the optical signal remains well confined within the core of the fiber. Doping with fluorine is typically uniform in the core and the cladding, respectively. The outer cladding may be a sleeved tube or an overcladding in silica particles, or pure or fluorine-doped silica deposited using the vapor phase axial deposit method (VAD).

Figure 2:
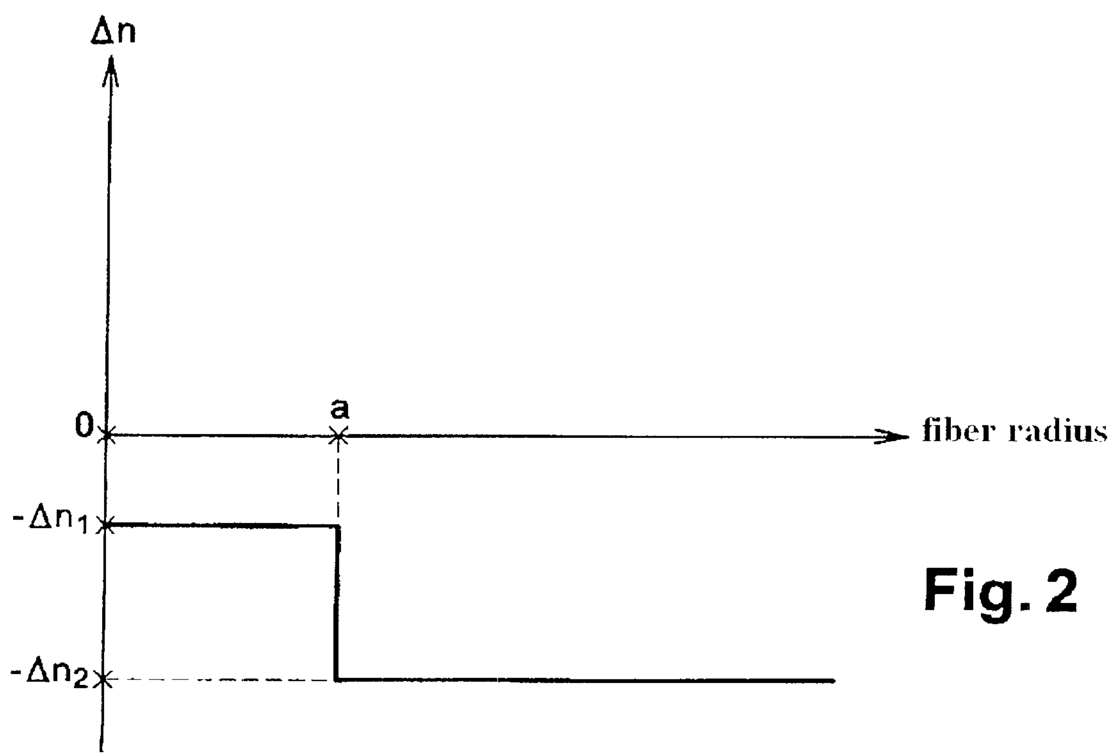
FIG. 2 depicts the set profile of a fiber according to a second embodiment of the invention.

FIG. 2 illustrates an index profile for a second embodiment of a transmission fiber according to the present invention. In this fiber embodiment, the fiber core contains 0.54 weight percent fluorine but no germanium and no phosphorus, and the cladding contains 1.9 weight percent fluorine. The core has a radius, a, of 4.35 microns and an absolute refractive index difference $|\Delta n_1|$ with silica of $2.0\times10^{-3}$. The cladding has an absolute refractive index difference $|\Delta n_2|$ with silica of $7.0\times10^{-3}$. Fluorine doping is typically uniform in the core and the cladding.

According to this second embodiment, the fiber is fabricated from a primary preform produced by deposition inside a fluorine-doped tube having substantially the same refractive index as the target depressed cladding. The outer cladding may be a sleeved tube of fluorine-doped silica or an overcladding of fluorine-doped silica particles. Techniques for fabricating primary preforms for fibers of the invention are described hereinafter.

The absolute refractive index difference ($|\Delta n_2|-|\Delta n_1|$) between the depressed cladding and the depressed core is at least $3\times10^{-3}$. This improves the performance of the inventive fiber, for instance, with respect to resistance to bending or cut-off wavelength.

With the foregoing fiber profiles depicted in FIGS. 1 and 2, it is possible to limit transmission losses of the fiber considerably under high radiation doses (e.g., more than 100 Gy).

Figure 3:
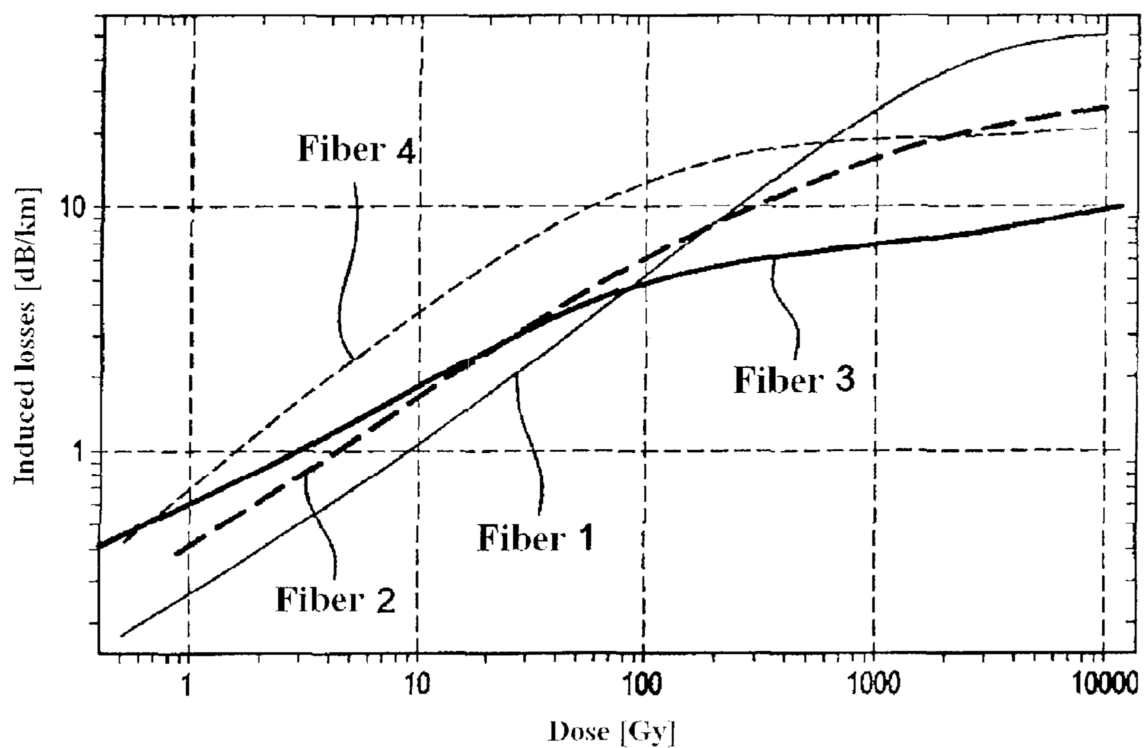
FIG. 3 depicts transmission losses after radiation for three comparative fibers and one fiber according to the invention.

FIG. 3 depicts the trend in radiation-induced transmission losses in relation to applied doses. Measurements were made by the Fraunhofer Institute (Appelsgarten 2-53879 Euskirchen—GERMANY) in September 2005 and March 2006 on behalf of CERN (1211 Geneva 23—SWITZERLAND).

In particular, FIG. 3 shows the transmission losses of four fibers: (1) one comparative fiber containing approximately 1 weight percent germanium in the core (Fiber 1); (2) one comparative fiber containing approximately 6 weight percent germanium in the core (Fiber 2); (3) one fiber according to the present invention (Fiber 3); and (4) one comparative fiber with a pure silica core (Fiber 4). FIG. 3 shows the transmission losses of each fiber measured at a wavelength of 1310 nanometers under radiation of 10,000 Gy at a rate of 0.225 Gy/s and a temperature of 28° C. over a fiber length of 100 meters and with an optical signal power between 10 and 40 μW.

The fiber of the present invention (Fiber 3) has much lower transmission losses than the fibers containing germanium in the core (Fiber 1 and Fiber 2) and the fiber with a pure silica core (Fiber 4), particularly after doses higher than 100 Gy.

The inventive fiber thus shows good resistance to radiation not only under high dose conditions (doses higher than 100 Gy) and at low dose rates (typically in the order of a few 0.01 Gy/s), but also at high rates (typically higher than a few Gy/s). For example, the inventive fiber has an attenuation increment of less than 20 dB/km at 1310 nanometers with radiation of 10,000 Gy conducted over a one-hour period. In addition, it shows a variation in attenuation increment of less than 100 percent for radiation ranging from 200 to 30,000 Gy at a rate of more than 1 Gy/s.

The inventive fiber meets all the criteria of standard G.652B. It can therefore be easily used in conjunction with SSMF fibers in optical communications systems.

The radius of the depressed cladding and the depressed core is such that it complies with the criteria of standard G.652 B.

The inventive fiber can be manufactured so that transmission losses are less than 5 dB/km, even less than 0.35 dB/km at 1310 nanometers, with no ionizing radiation.

The transmission fiber of the invention can be fabricated by drawing from a preform having an index profile such as described previously.

In a known manner, an optical fiber is produced by drawing a preform on a drawing tower. A preform includes, for example, a primary preform consisting of a high quality glass tube that forms part of the cladding and the core of the fiber. This primary preform can then be overcladded or sleeved to increase its diameter and form a final preform, which can be used on a drawing tower. In this context, the cladding formed inside the tube is called the inner cladding, and the cladding formed outside the tube is called the outer cladding.

The homothetic drawing includes placing the preform vertically in a tower and drawing a fiber strand from one end of the preform. To do so, a high temperature is locally applied to one end of the perform until the silica softens. The drawing speed and temperature, which determine the stability of the fiber properties along the preform, are then controlled during fiber drawing. In particular, diameter stability will ensure the stability of propagation properties (e.g., cut-off wavelength and mode diameters). The geometry of the preform must fully comply with the ratios of refractive indexes and diameters of the fiber core and fiber cladding so that the drawn fiber achieves the required profile.

The component depositing in the tube is commonly called "doping" (i.e. "impurities" are added to the silica to modify its refractive index). According to the invention, fluorine is used to form the depressed core and depressed cladding of the fiber.

A preform with a highly depressed cladding is difficult to produce. Fluorine does not incorporate well into silica that is heated beyond a certain temperature, yet a high temperature is necessary for fabricating the glass. Compromising between the high temperature needed to fabricate the glass and a low temperature to promote good incorporation of the fluorine, however, does not make it possible to achieve indexes that are much lower than the silica index.

It is proposed to fabricate the preform for the inventive fiber using plasma chemical vapor deposition (PCVD). With this technique, it is possible to achieve reactions at lower temperatures than with conventional techniques (CVD, VAD, and OVD) through ionization of the reaction compounds. This kind of fabrication technique is described by U.S. Reissue patent No. Re 30,635 and U.S. Pat. No. 4,314,833; it allows substantial incorporation of fluorine in the silica to form highly depressed claddings. That said, fabrication methods other than PCVD may be considered, too.

The fiber of the present invention comprises a core and a cladding with highly depressed indexes (i.e., having index differences with the outer cladding of more than $1.5\times10^{-3}$ and $4.5\times10^{-3}$, respectively).

A tube of pure or fluorine-doped silica is provided and mounted in a glass-making lathe. The tube is rotated and a gaseous mixture of doped or non-doped glass precursor gases is supplied within the tube. By application of microwave radiation, plasma is generated inside the tube. Layers of (doped) glass are thereby deposited inside the tube.

The strong reactivity of the dopants generated by microwave heating allows a high concentration of dopants to be incorporated in the silica layers. In particular, for fluorine, which cannot be incorporated properly in silica under local blowpipe heating, PCVD enables the doping of a silica layer with a high concentration of fluorine to form the depressed cladding.

In accordance with the foregoing, the transmission fiber of the invention can be used in an optical communications system located in an environment exposed to high ionizing radiation (e.g., an intranet in a particle physics laboratory, a nuclear plant, or a satellite exposed to cosmic radiation).

In the specification and the figures, typical embodiments of the invention have been disclosed. The present invention is not limited to such exemplary embodiments. Specific terms have been used only in a generic and descriptive sense, and not for purposes of limitation. The scope of the invention is set forth in the following claims.

The invention claimed is:

1. A single mode optical transmission fiber, comprising:

a depressed core having at least 0.41 weight percent fluorine, said depressed core possessing an absolute refractive index difference ($|\Delta n_1|$) with pure silica of greater than $1.5\times10^{-3}$; and a depressed cladding having at least 1.2 weight percent fluorine, said depressed cladding possessing an absolute refractive index difference ($|\Delta n_2|$) with pure silica of greater than $4.5\times10^{-3}$;

wherein said fiber possesses an absolute refractive index difference ($|\Delta n_2|-|\Delta n_1|$) between its depressed cladding and its depressed core of at least about $3\times10^{-3}$; and wherein said fiber, at a wavelength of 1310 nanometers, exhibits a variation in attenuation of less than 100 percent for radiation between about 200 and 30,000 Gy at a rate of more than 1 Gy/s.

2. The fiber according to claim 1, wherein said core is substantially free of both germanium and phosphorus.

3. The fiber according to claim 1, wherein the ratio of fluorine concentration in the core to fluorine concentration in the cladding is greater than 3.

4. The fiber according to claim 1, wherein transmission losses are less than 5 dB/km at 1310 nanometers without any ionizing radiation.

5. The fiber according to claim 1, wherein said core possesses a fluorine concentration of less than about 1.4 weight percent.

6. The fiber according to claim 1, wherein:

at a wavelength of 1310 nanometers, the mode field diameter (MFD) is between 8.6 microns and 9.5 microns; and the cabled cut-off wavelength is 1260 nanometers or less.

7. The fiber according to claim 1, wherein the link-polarization mode dispersion is less than or equal to 0.2 $ps/km^{1/2}$.

8. The fiber according to claim 1, wherein said core is substantially free of germanium.

9. The fiber according to claim 1, wherein said core is substantially free of phosphorus.

10. The fiber according to claim 1, wherein transmission losses are less than 0.35 dB/km at 1310 nanometers without any ionizing radiation.

11. The fiber according to claim 1, wherein, at a wavelength of 1310 nanometers, the mode field diameter (MFD) is between 8.6 microns and 9.5 microns.

12. The fiber according to claim 1, wherein said fiber has a cabled cut-off wavelength of 1260 nanometers or less.

13. A communication optical system within an environment exhibiting ionizing radiations, the optical system comprising at least a portion of a fiber according to claim 1.

14. A single mode optical transmission fiber, comprising:

a depressed core having between about 0.4 and 1.4 weight percent fluorine, said depressed core being substantially free of germanium and phosphorus; and a depressed cladding having a fluorine concentration that is at least 3× the fluorine concentration of said depressed core;

wherein, as compared with the refractive index of pure silica, said depressed core possesses an absolute refractive index difference ($|\Delta n_1|$) of greater than $1.5\times10^{-3}$; and wherein, as compared with the refractive index of pure silica, said depressed cladding possesses an absolute refractive index difference ($|\Delta n_2|$) of greater than $4.5\times10^{-3}$; and wherein said fiber possesses an absolute refractive index difference ($|\Delta n_2|-|\Delta n_1|$) between its depressed cladding and its depressed core of at least about $3\times10^{-3}$ ; and wherein said fiber, at a wavelength of 1310 nanometers, exhibits a variation in attenuation of less than 100 percent for radiation between about 200 and 30,000 Gy at a rate of more than 1 Gy/s.

15. The fiber according to claim 14, wherein transmission losses are less than 5 dB/km at 1310 nanometers without any ionizing radiation.

16. The fiber according to claim 15, wherein transmission losses are less than 0.35 dB/km at 1310 nanometers without any ionizing radiation.

17. The fiber according to claim 14, wherein, at a wavelength of 1310 nanometers, the mode field diameter (MFD) is between 8.6 microns and 9.5 microns.

18. The fiber according to claim 14, wherein said fiber has a cabled cut-off wavelength of 1260 nanometers or less.

19. The fiber according to claim 14, wherein the link-polarization mode dispersion is less than or equal to 0.2 $ps/km^{1/2}$.

20. A communication optical system within an environment exhibiting ionizing radiations, the optical system comprising at least a portion of a fiber according to claim 14.

* * * * *